United States Patent Office

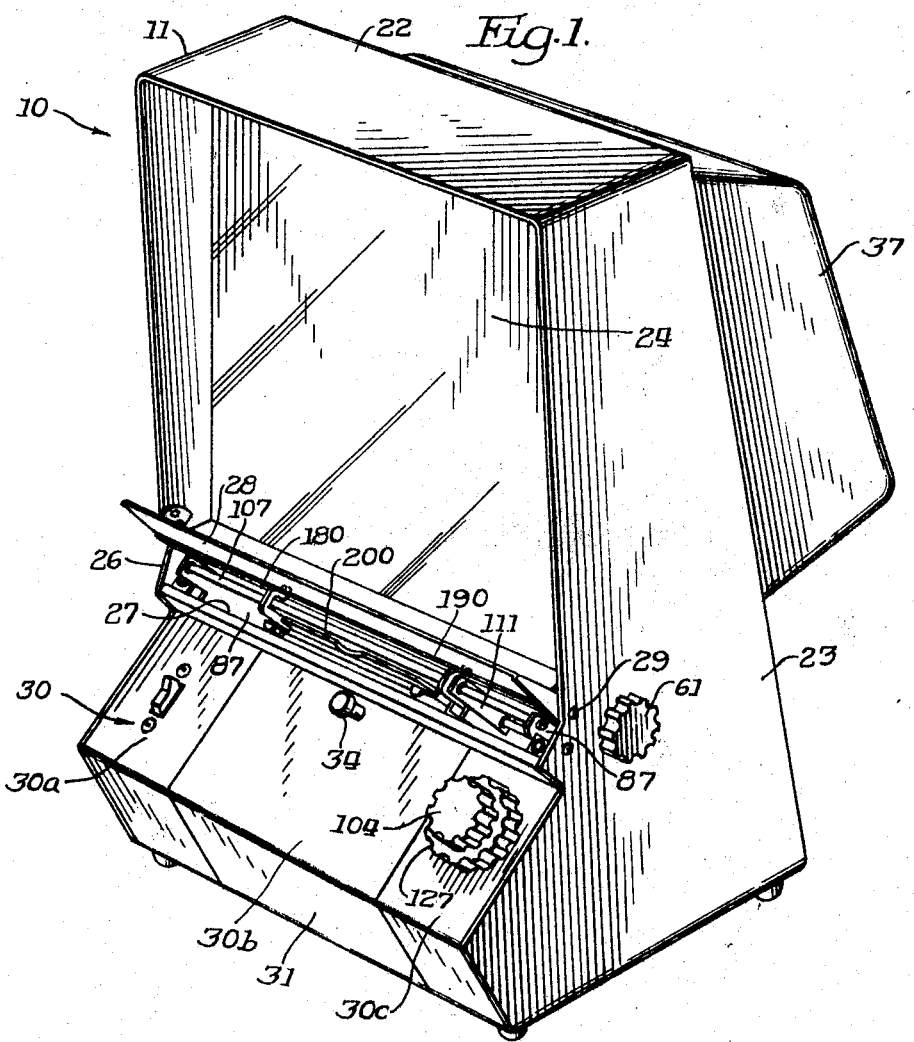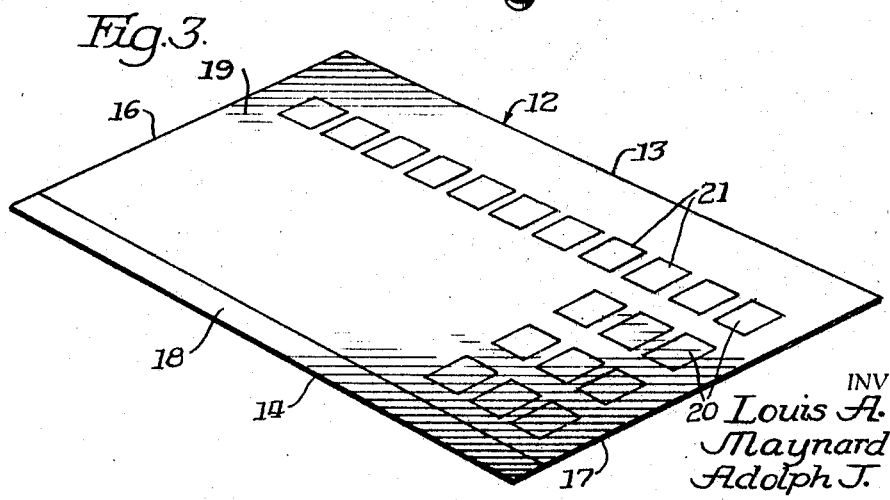

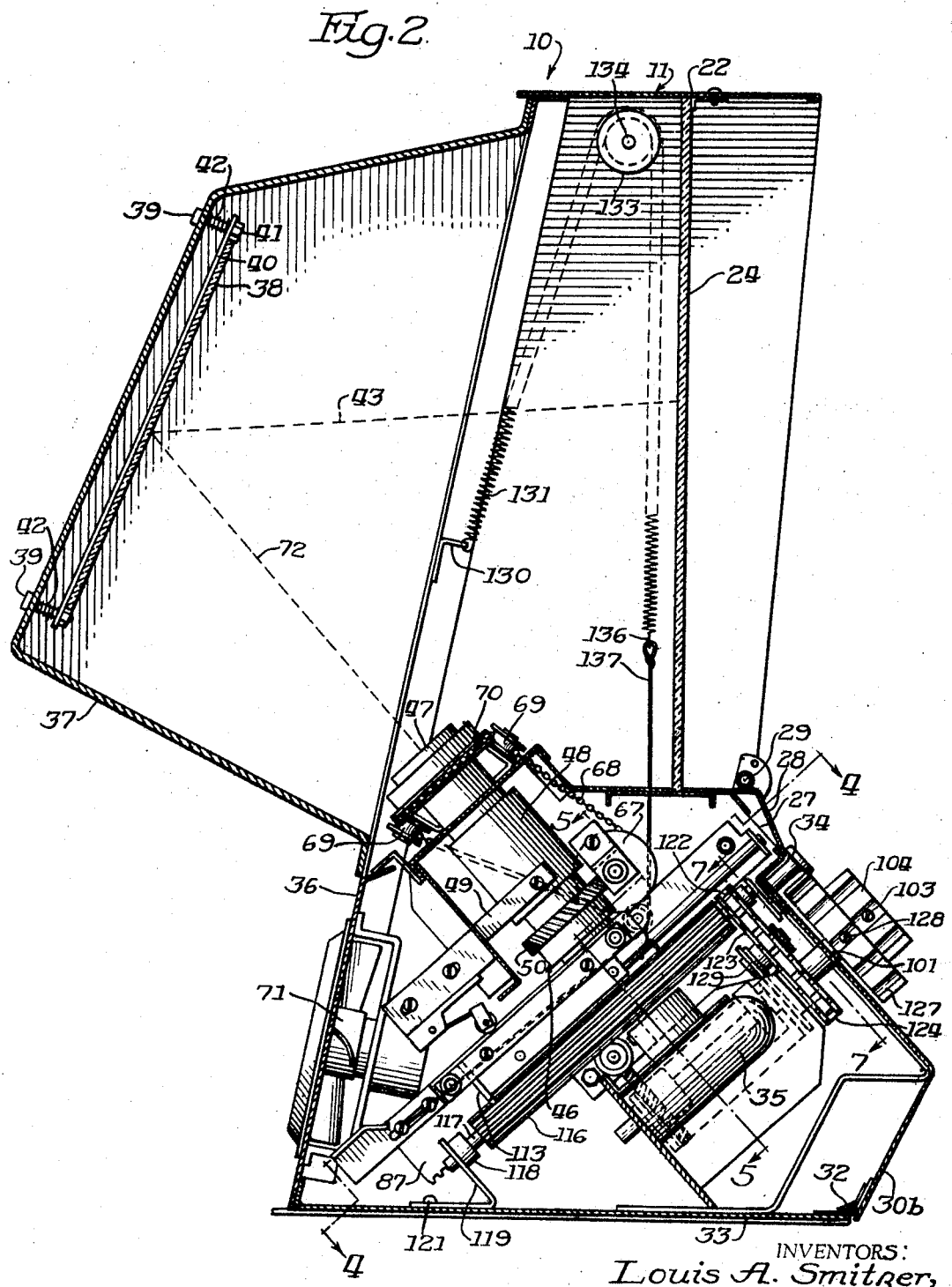

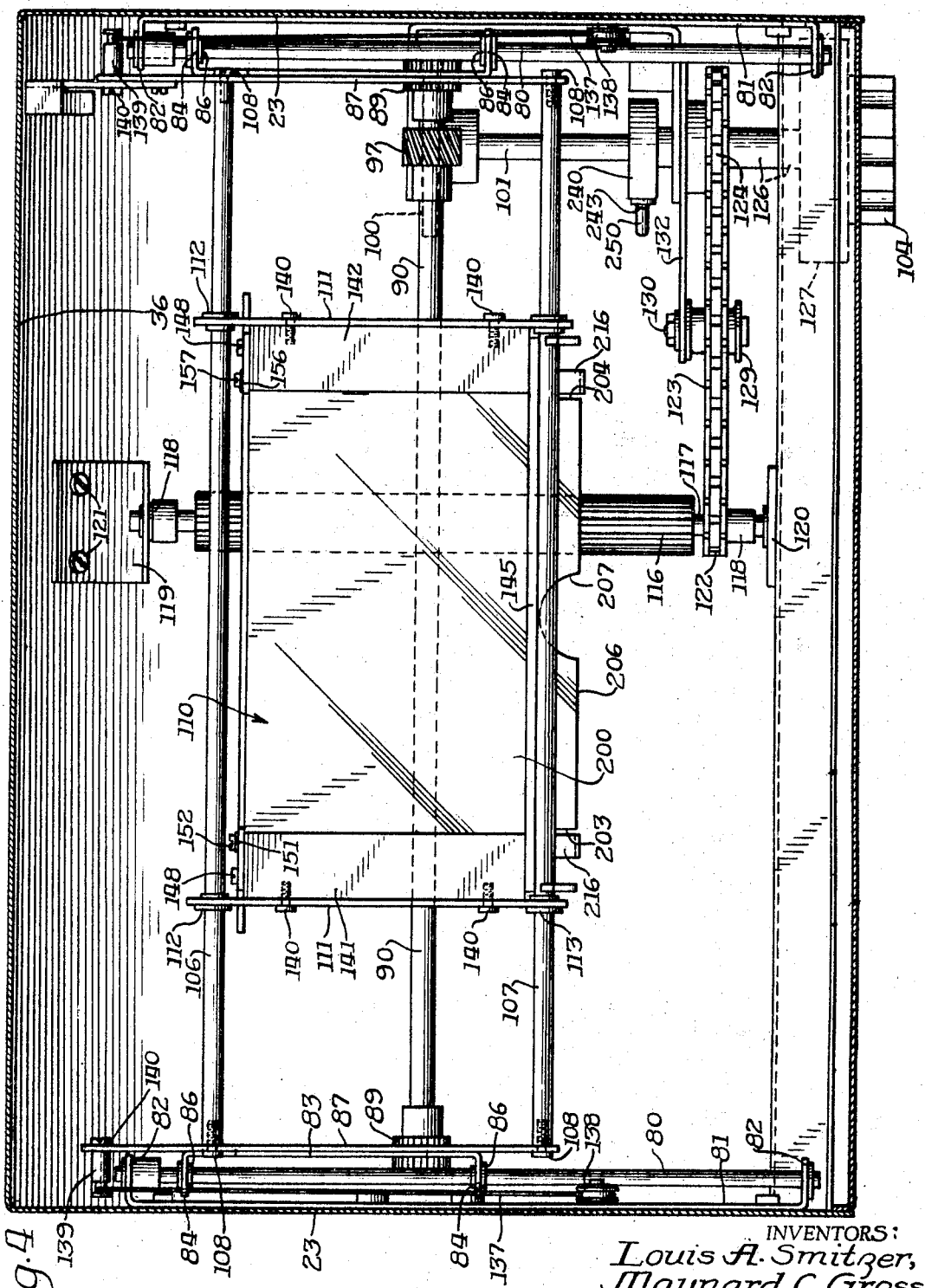

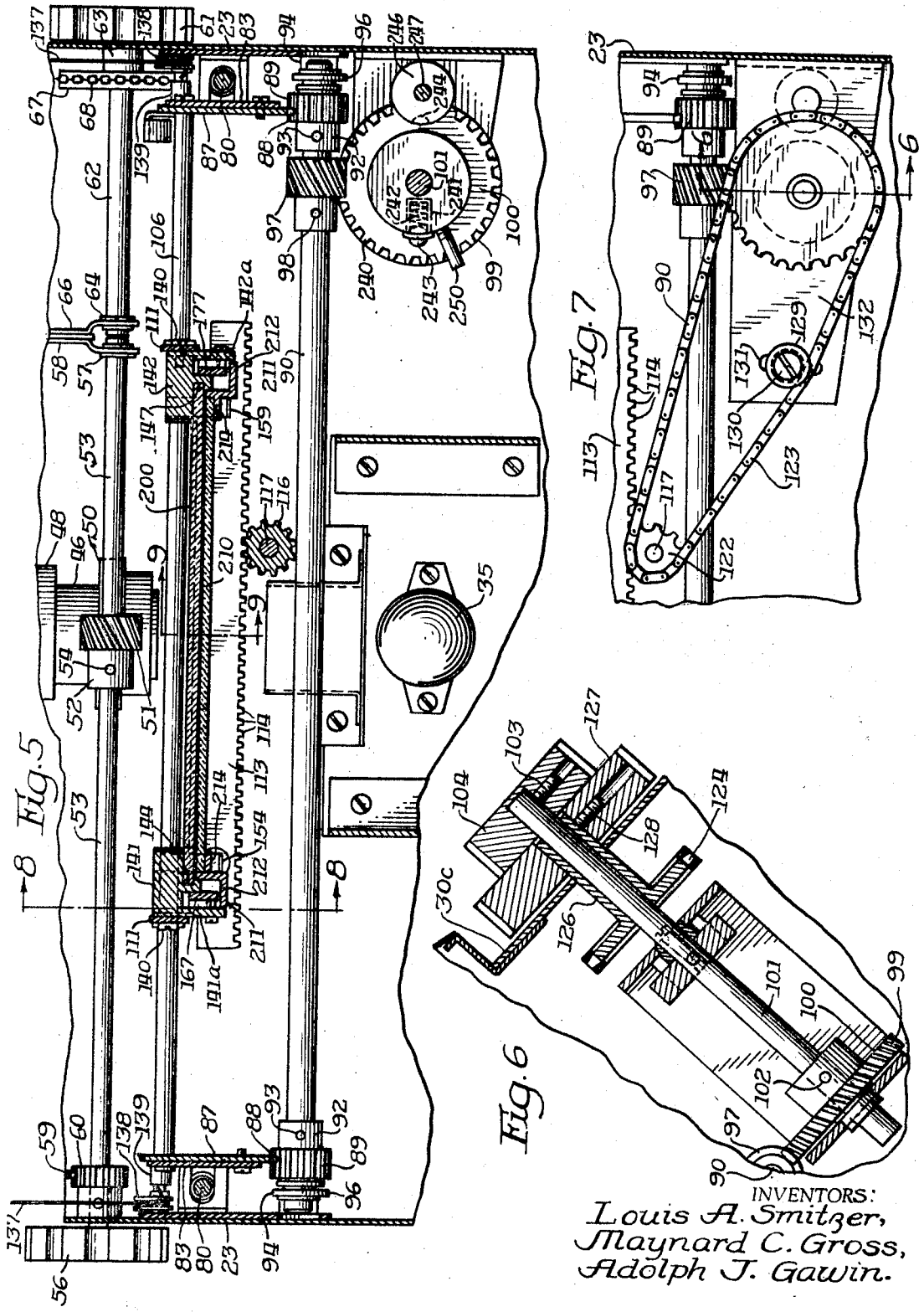

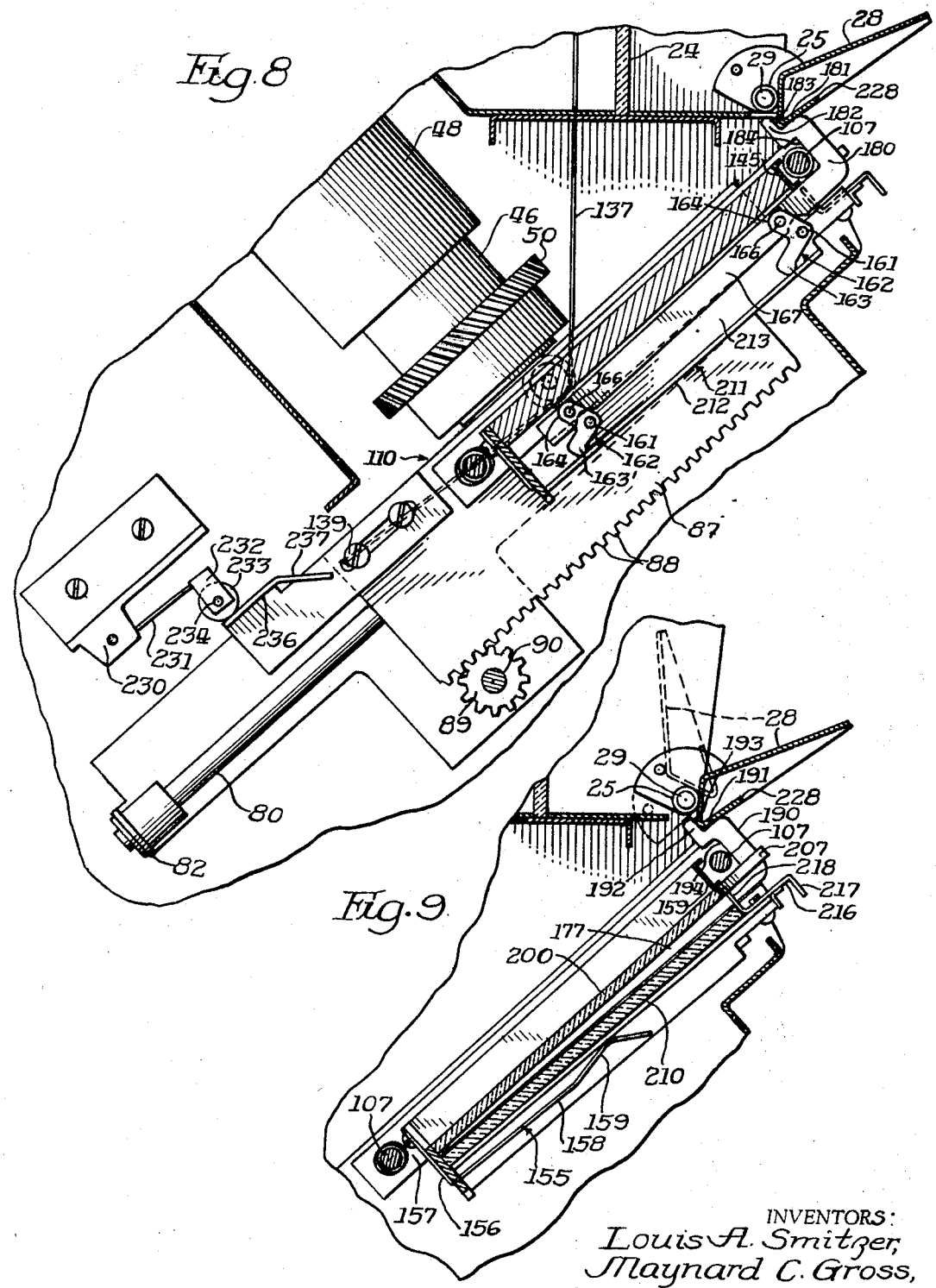

3,446,552
Patented May 27, 1969

3,446,552
MICROFICHE READER
Maynard C. Gross, Chicago, Adolph J. Gawin, Skokie, and Louis A. Smitzer, Chicago, Ill., assignors to Bell & Howell Company, Chicago, Ill., a corporation of Illinois
Filed May 10, 1966, Ser. No. 549,063
Int. Cl. G03b 23/08
U.S. Cl. 353—27      8 Claims

ABSTRACT OF THE DISCLOSURE

Apparatus for viewing flat microfiche comprising a microfiche holder frame which is adjustable for scanning movement in a horizontal and vertical direction. The holder frame is movable into an access opening at the upper limit of the vertical scan movement. When the holder frame is moved in to the access opening, it automatically opens a pivoted door normally closing the access opening. The movement of the door serves to actuate a camming device for automatically camming a pair of glass plates apart, thus facilitating insertion and removal of a microfiche from between the glass plates.

---

This invention relates generally to improvements in a flat film viewing apparatus and more particularly relates to a flat fiche reader having a fiche holder frame adjustable in longitudinal and transverse scanning movements, the holder frame being movable into an access opening at the upper limit of vertical scan movement, thereby to automatically open a pivoted door normally closing the access opening and the door, in turn, serving to actuate a camming means for automatically camming a pair of glass plates apart as the holder is moved into the access opening and facilitating insertion and removal of a fiche from between the glass plates.

In viewing apparatus for selectively viewing microimages disposed in columns and rows on a flat piece of film, it is necessary and desirable that the film be positioned accurately in the focal plane of an optical system having a light source, an enlarging lens and a viewing screen. A particularly advantageous manner of insuring that the film is held in a flat planar disposition, is to locate the film between two plates of flat glass. However, in order to insert or remove the film from between the plates of glass, the plates must be separated or cammed apart in order to form a throat opening. In prior art arrangements, wedges have been used which are forced between the glass plates. Such wedging arrangements exert considerable pressure on the edges of the glass, thereby causing chipping and sometimes complete breakage of the glass plates.

In accordance with the principles of the present invention, a film holder is provided for a flat fiche reader in which the glass plates are movable vertically to an access opening in the housing or casing for easy loading access. The plates are automatically cammed apart for easy removal or insertion of the film or fiche at the end of the upwardly traversing movement.

It is an object of the present invention, therefore, to provide an improved microfiche reader which overcomes the deficiencies of the prior art arrangements heretofore provided.

Yet another object of the present invention is to provide a film holder for a reader in which the glass plates are moved vertically to an opening in the housing for easy access and are automatically cammed apart for easy removal of the film at the end of their upwardly traversing movement.

Yet another object of the present invention is to provide improved camming means for separating glass plates in a flat film holder.

Many other features, advantages and additional objects of the present invention will become manifest to those versed in the art upon making reference to the detailed description which follows and the accompanying sheets of drawings in which a preferred structural embodiment of a microfiche reader is shown by way of illustrative example and in which the novel improvements of the present invention are embodied.

On the drawings:

FIGURE 1 is an isometric view of a microfiche reader incorporating the principles of the present invention.

FIGURE 2 is a cross-sectional view of the microfiche reader of FIGURE 1.

FIGURE 3 is an isometric view of a fiche containing multiple microimages and typifying a flat film record of the type utilized with great advantage in the microfiche reader of the present invention.

FIGURE 4 is a cross-sectional view taken on line IV—IV of FIGURE 2.

FIGURE 5 is a cross-sectional view fragmentary in part taken on line V—V of FIGURE 2.

FIGURE 6 is a fragmentary view enlarged to show additional details of the adjustment knob and drive system.

FIGURE 7 is a fragmentary view taken on line VII—VII of FIGURE 2.

FIGURE 8 is a cross-sectional view taken on line VIII—VIII of FIGURE 5.

FIGURE 9 is a cross-sectional view taken on line IX—IX of FIGURE 5.

As shown on the drawings:

Figure 10:
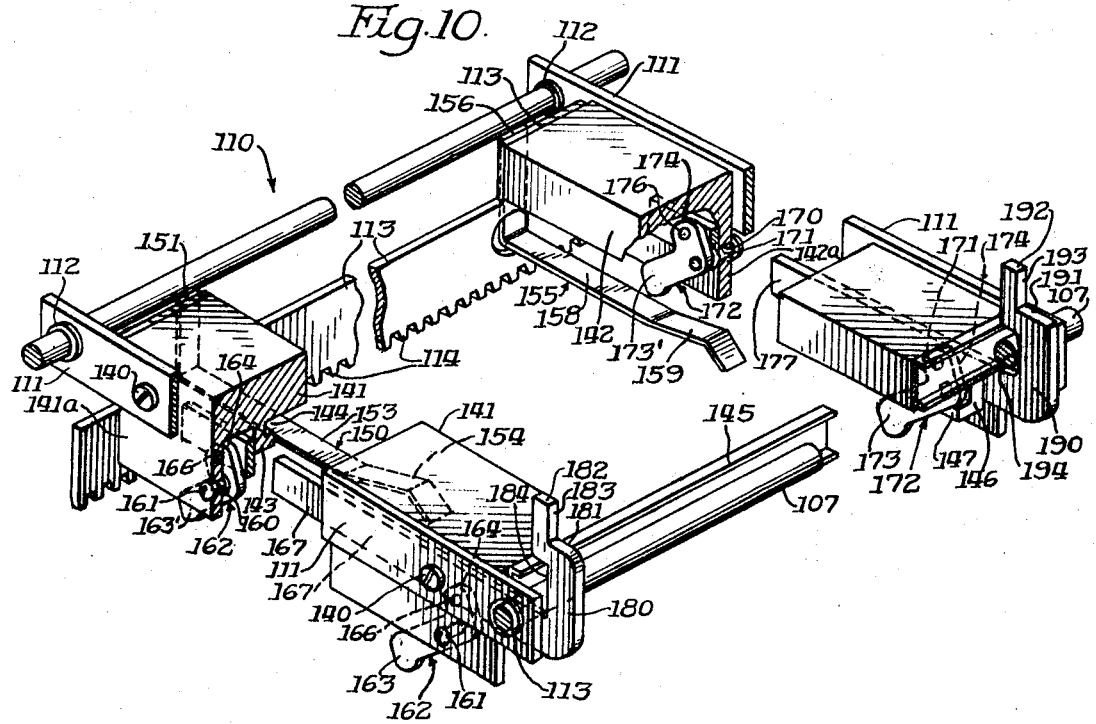
FIGURE 10 is a perspective view showing additional details of the frame construction and adjustable camming means are provided in accordance with the principles of the present invention and with parts broken away for purposes of clarity in illustration.

The reader or viewer of the present invention is shown generally at 10 and comprises a casing 11 which forms a housing for completely enclosing the components of the viewing apparatus.

FIGURE 3 shows a typical flat film medium identified generally at 12 and which film medium is generally known by those versed in the art as a "fiche." Thus, the fiche 12 is generally rectangular in configuration having a bottom longitudinal edge 13 and an upper longitudinal edge 14 as well as transverse edges 16 and 17. Along the upper longitudinal edge 14 and inwardly therefrom, is a strip 18 which can be opacified for purposes of containing suitable indicia such as a title or other identification information. The body of the fiche is shown generally at 19 and is characterized by horizontal rows 20 and vertical columns 21 of microimages. The purpose of the reader or viewer 10 is to permit selective vertical and horizontal scanning of the fiche 12 in order to selectively view any of the images appearing in the rows 20 and columns 21.

The casing 11 which forms the housing for the reader or viewer 10 has an upper wall 22 and oppositely disposed spaced apart side walls 23. The front wall is particularly characterized by an upright viewing screen 24, which viewing screen may be conveniently made of frosted glass.

At the lower extremity of the viewing screen 24, the casing 11 has a portion 26 which extends downwardly and forwardly and prescribes the confines of an access opening 27 affording access for insertion or removal of a fiche into a film holder incorporated in the apparatus. The access opening 27 is closed by a hinged door 28 pivotally carried on a hinge pin 29 and biased by a spring 25 into the closed position.

A second forwardly and downwardly extending wall, shown generally at 30, provides a control panel surface for the casing 11 and terminates in a front wall 31 disposed at a re-entrant angle.

The control portion of the casing is divided into three separate sections shown at 30a, 30b, and 30c. Thus, the portion referred to as 30b is connected by means of a hinge 32 to the bottom wall 33 of the casing 11 so that a knob-type handle 34 may be manually grasped and the entire center section 30b pivotally moved in a forward direction to uncover the interior of the casing to afford access to such components as may require attention, for example, in order to relamp the light source which is located subjacent the control panel 30 and which is shown as comprising a light bulb 35.

The casing 11 has a rear wall 36 to which is attached a rearwardly projecting extension 37, the principal function of which is to mount and carry a mirror 38. The mirror 38 is carried by means of a plurality of bolts 39 extending through appropriate openings in a frame 40 for the mirror 38 and connected thereto by means of nuts 41. Suitable coil springs 42 surround the bolts 39 and tend to continuously load the mirror in such a manner that adjustment of the nuts 41 on the bolts 39 will permit optical adjustment of the mirror 38 in alignment with the viewing screen 24 as is depicted by the optical axis shown in dashed lines and identified at 43 in FIGURE 2.

Interposed between the mirror 38 and the light source 35, is an optical system including a rotatably adjustable lens shown generally at 46. The optical system may also include an image rotation means such as a dove prism shown generally at 47, thereby to permit selective optical rotation of the image for better viewing on the viewing screen 24.

As shown in FIGURE 2, the main lens barrel 48 is carried in a bracket 49. The rotatably adjustable lens 46 has a gear 50 meshing with another gear or worm 51 carried by a hub 52 locked to a shaft 53 by means of a set screw 54 and which shaft extends outwardly through one of the side walls 23 of the casing 11 for connection to a focus adjustment knob 56 (FIGURE 5).

One end of the shaft 53 is journaled in a bearing 57 supported by a hanger arm 58, while the other end of the shaft 53 is journaled in appropriate bearing means supported by the casing wall 23. A stop pin 59 projects radially outwardly of a hub member 60 co-rotatable with the shaft 53 and operates in cooperation with suitable abutment means to prevent the rotatable lens 46 from jamming at the end of its rotatable adjustment, thereby effectively limiting the amount of lens rotation.

In order to rotatably adjust the image rotation means, an image rotation knob 61 is connected to a shaft 62 journaled in one of the side walls 23 in a bearing 63 and the opposite end of which is journaled in a bearing 64 carried by a hanger arm 66 in the casing 11.

Inside of the casing, the shaft 62 has co-rotatably connected therewith a driving sprocket 67 over which is threaded a bead chain 68. As shown in FIGURE 2, the bead chain 68 passes over guide pulley wheels 69, 69, and engages a sprocket wheel 70 for rotatably adjusting the image rotation means 47.

Mounted in the rear wall 36 is a fan 71 provided for the purpose of circulating a flow of cooling air through the interior of the housing provided by the casing 11.

Light rays projected by the light bulb 35 will be directed through the optical system towards the mirror 38, as depicted by the optical axis shown in dotted lines in FIGURE 2 at 72. It is contemplated by the present invention that there be provided a frame for supporting a fiche 12 in the optical system intermediate the viewing screen 24 and the light source 35, or more specifically, between the mirror 38 and the light source 35. Accordingly, a suitable frame is mounted for movement longitudinally and transversely of the fiche to position different ones of the multiple images on the fiche in registration with the optical system. The frame construction includes, first of all, a pair of rods 80, 80 carried in a corresponding pair of support brackets 81, 81 each securely fastened to a corresponding side wall 23 of the casing 11 and each bracket 81 having spaced apart offset lug portions 82. Thus, the rods 80, 80 form a track for slidably supporting a frame along a confined path of linear travel.

As shown in FIGURE 4, a frame bracket 83 having offset arms 84 each receiving a bearing insert 86 to facilitate sliding engagement with a corresponding rod 80 is, in turn, connected in firm assembly with a rack 87. As shown in FIGURE 8, the rack 87 has a row of rack teeth 88 meshing with the teeth of a rack pinion 89 rotatably carried on a shaft 90. Since there is a rack 87 at both sides of the machine, it is necessary to provide a double rack pinion for meshing with the teeth of each respective rack pinion 89. Accordingly, it will be noted upon referring to FIGURE 5 that there are two rack pinions 89 co-rotatably connected to a common shaft as at 90, each rack pinion 89 including a hub portion 92 and a set screw 93. The ends of the shaft 90 are journaled for rotation in appropriate bearings shown at 94 and which bearings are carried in a bearing bracket 96 supported on the side walls 23, 23 of the casing 11.

In order to rotatably drive the shaft 90 in selective direction, a worm or gear 97 is co-rotatably connected to the shaft 90 by a set screw 98 and meshes with the teeth 99 of a gear 100 carried on a shaft 101. The gear 100 is locked for co-rotation with the shaft 101 by a set screw 102, as shown in FIGURE 6. The shaft 101 extends at right angles through the control panel 30 and has connected to the projecting free end thereof, as by means of a set screw 103, a vertical scan adjustment knob 104.

Referring now, further, to FIGURE 4, it will be noted there is extended between the oppositely disposed racks 87, 87 a pair of spaced horizontal traverse rods 106 and 107 connected in firm assembly with the respective racks 87, 87 by fasteners such as screws shown at 108.

The rods 106 and 107 form a track to slidably support a frame shown generally at 110 and comprising side frame members 111 each carrying a bearing 112 and 113 for sliding engagement with a corresponding horizontal traverse rod 106 and 107, respectively.

Referring to FIGURE 10 in conjunction with FIGURE 4, additional details of the frame 110 are illustrated and it will be noted that there is connected to the frame at the bottom end thereof a rack member 113 having a longitudinal row of teeth 114 adapted to mesh with an elongated rack pinion 116 which is carried on a shaft 117 journaled in spaced bearings 118 supported in one end by a bracket 119 and supported at the other end by a bracket 120, which brackets 119 and 120 are, in turn, connected to the casing 11 by means of sutiable fasteners 121.

The shaft 117 has connected thereto a toothed sprocket 122 over which is threaded a sprocket chain 123 and which is driven by a sprocket wheel 124 carried on a hub 126 which is, in turn, journaled for rotation on the shaft 101 (FIGURE 6) and which hub 126 extends through the control panel 30 at the wall portion 30c. A horizontal scan adjustment knob is identified at 127 and is connected in co-rotatable assembly with the hub 126 by means of a set screw 128. It will be noted the knob 127 is of a larger diameter than the vertical scan adjustment knob 104 and since the hub 126 is journaled on the shaft 101, both knobs 104 and 127 are concentrically disposed so that both vertical and horizontal adjustments may be effected with the two control knobs 104 and 127.

The chain 123 is threaded over the sprocket wheel 124 and it will be noted that an idler roller 129 journaled on a pin shaft 130 engages the sprocket chain 123 to take up the slack in the chain. The pin shaft 130 may be adjusted in a slot 131 formed in a support bracket 132 carried by the casing 11, thereby to adjust the position of the idler roller 129.

In order to counterbalance the frame assembly and thereby facilitate vertical scan, a mounting clip 130 is connected at each side of the reader 10 to the rear wall 36 and a coiled counterbalance spring 131 is connected to each respective clip 130 as at 132. Each respective spring is tranied over a pulley wheel 133 carried for rotation by a pulley pin 134 and the opposite end of the spring is then connected as at 136 to a flexible cord 137. The cord 137 is trained over a guide pulley 138 journaled for rotation on an adjoining side wall 23 and is connected to the lowermost portion of the frame by means of a connecting pin 139 fastened to each corresponding rack by a fastener 140.

The details of the fiche holder or frame 110 will be understood upon referring to FIGURE 4 in conjunction with FIGURES 8–11. Thus, it will be noted that the side members 111, 111 are connected by means of screws 140 to an adjacent holder slide 141 and 42, respectively. The holder slide 141 comprises an elongated metal member assembly, rectangular in its main cross section, but having projecting from one wall thereof a portion which is L-shaped in configuration and which is identified at 143. The T-shaped portion 143 forms a slide track 144 in which one of a pair of glass plates may be received.

The holder slide 142 is also generally rectangular in its main body configuration, however, there is projecting from one wall thereof an L-shaped portion 146 disposed with its leg facing towards the slide track 144, thereby to form a slide track 147 also providing a slide track for receiving the opposite edge of one of the glass plates.

The rack member 113 is connected in firm assembly to the holder slides 141 and 142 by means of a pair of screws 148, 148. A spring clip is provided for each holder slide, there being a first spring clip 150 having a leg 151 connected by means of a screw 152 to the end of the holder slide 141 and having a long leg 153 with an offset cam portion 154 extending upwardly to resiliently engage and continuously bias a glass plate surface situated adjacent thereto.

A second spring clip shown generally at 155 has a leg 156 connected to the end of the holder slide 142 by means of a screw 157 and includes a long leg 158 with an offset cam porjtion 159 also arranged to engage and continuously resiliently bias an adjoining glass plate surface.

A channel member 145 extends between the two holder slides 141 and 142 and is preferably connected thereto for rigidifying the frame or holder 110.

At the outer edge of the holder slide 141, there is provided a wall 141a, the wall 141a is apertured as at 160, thereby to receive a pivot pin 161, pivotally supporting a crank member 162. Each crank member 162 has a camming arm 163 with a camming surface formed thereon as well as an arm 164 which is pivotally connected as by pivot pin 166 to an elongated actuator member 167.

As shown best in FIG. 8, the camming arm 163' is shorter than the corresponding camming arm 163. Thus when the glass plates are separated as in the position shown in FIG. 8, they are not parallel, but glass plate 210 is separated further from glass plate 200 at the throat T than at the lower end of the frame. Camming arm 173 (FIG. 10) is likewise shorter than the corresponding camming arm 173 nearest the throat.

In like manner, on the other side of the frame 110, the holder slide 142 has a wall at its outermost edge which is shown at 142a and which is apertured as at 170 to receive a pivot pin 171 connected to a crank member 172 having a cam arm 173 with a cam surface formed thereon as well as a pivot arm 174 pivotally connected by means of a pivot pin 176 to an elongated actuator member 177.

The elongated actuator 167 has, at its upper end, a transversely extending arm 180 stepped as at 181 and including a transversely projecting lug 182 provided with an action surface 183.

The elongated actuator 177 likewise has at its upper end a transversely extending arm 190 stepped as at 191 and having a transversely projecting lug 192 formed with an action surface 193. Because of the stepped configuration, the inside of each respective arm portion 180 and 190 is recessed as at 184 and 194, respectively, through which recess the rod 107 extends.

Figure 11:
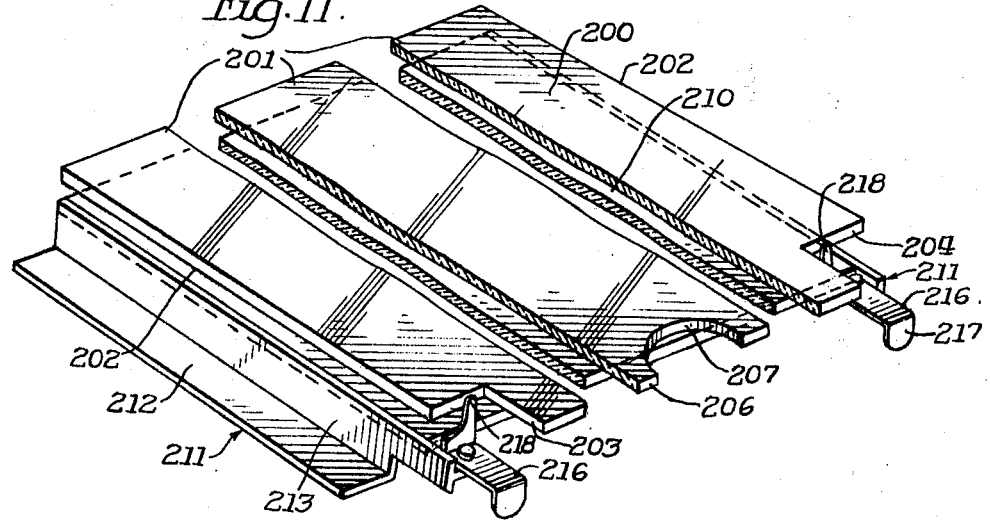
FIGURE 11 is a broken perspective view showing additional details of the glass plates of the present invention.

The details of the glass plate construction are illustrated in FIGURE 11 wherein one of the glass plates disposed in the uppermost portion of FIGURE 11, is shown at 200 and has a lower edge 201 and oppositely disposed side edges 202, 202. The upper edge is notched as at 203 and 204 at each corner and the upper edge identified at 206 is further provided with a semi-circular recess 207 at about its midpoint, thereby to facilitate grasping of a fiche from between the glass plate 200 and a second glass plate shown generally at 210.

The second glass plate 210 is essentially rectangular in configuration and is mounted for example, by gluing on opposite sides by a shaped metal reinforcement shown generally at 211 and including a leg 212 disposed in a plane parallel to the glass plate 210, as well as an upright leg 213 disposed at right angles thereto. The opposide edges of the glass plate 210 abut against an inwardly extending flange 214, which flange 215 also carries a metal clip member 216 having an arcuate flange 217 at the free end thereof and including an offset finger portion 218 at the innermost end thereof which overlies the edge of the glass plate 200 at the notched portion 203 and 204. The offset finger portion 218 acts as a side guide for a fiche being inserted between the glass plates. The finger portion 218 is of sufficient length to extend past the glass plate 200 when the glass plates are separated for receiving a fiche therebetween.

The glass plate unit of FIGURE 11 is assembled into the frame 110 of FIGURE 10 by inserting the glass plate 200 into the tracks, 144, 147 and by inserting the glass plate 210 adjacent thereto, whereupon the cam members 163 and 173 will engage against the corresponding surfaces of the reinforcement member 211 at the area of the leg 212. The glass plates will be clamped by the spring arms 150 and 155 against the holder slides 141 and 142, thereby normally keeping the glass plates continuously spring-biased together. The plate 200 is confined in the tracks 144 and 147.

In accordance with the principles of the present invention, it is contemplated that the movement of the frame 110 to the limit of vertical scan will not only automatically open the hinged door 28 covering the access opening 27, but, further, the glass plates 200 and 210 will be automatically separated by a camming action, thereby facilitating insertion and removal of a fiche from between the plates. This action can be noted upon making reference to FIGURES 1, 2, 8 and 9. In FIGURE 2 the frame is disposed at a lower position of adjustment insofar as vertical scan is concerned and it will be noted that the pivoted door 28 is in the closed position relative to the access opening 27. The door 28 may conveniently be fabricated from sheet metal material and it will be noted that the door 28 is characterized by a reversely turned inwardly directed lug or leg 228 which extends into the access opening for engagement with the transverse arms 180 and 190 of the elongated actuators 167 and 177.

Such engagement is illustrated in FIGURE 8 wherein the lug 228 has been engaged by the transverse arms 180 and 190 to such an extent that the door 28 is completely opened and the lug 228 has moved into the stepped portion 181 and 191 of the arms 190. When in that position, further movement of the frame 110 in the plane of vertical scan will engage the action surfaces 183 and 193 of the transverse arms 180 and 190 against the acute corner portion of the door 28 at the end of the lug 228. Thus, any further relative movement of the frame 110 and the vertical scanning actuating means, including the racks 87, 87, will result in a pivoting motion of the cranks 162 and 172 so that the camming arms 163 and 173 will engage against the legs 212, 212 of the glass plate 210 reinforcement members 211 and the glass plate 210 will be pivotally displaced against the continuous bias of the spring arms 150 and 155 to open up a throat, as shown at T in FIGURE 9 between the glass plates 200 and 210.

Accordingly, since the frame 110 has positioned the plates 200 and 210 at the uppermost limit of vertical scan movement, the throat T is positioned directly in the access opening 27 for convenient loading or unloading, and a fiche, such as the fiche 12, may be quickly and readily inserted or removed from between the glass plates 200 and 210. As soon as initial loading or re-loading of a fiche 12 into the fiche holder is accomplished, the vertical scan knob 104 can be operated, whereupon the plates will be automatically spring-biased together clamping the fiche 12 in flat position at proper alignment relative to the focal plane of the optical system.

An electrical control switch is shown generally at 230 and has a spring actuator arm 231 on the end of which is carried a bifurcation 232 journaling a feeler roller 233 on a pin 234. The roller engages a cam surface 236 formed by a flange offset as at 237 so that the switch 230 will be operated as a function of the positioning of the frame 110 in the path of vertical scan.

In order to hold the frame 110 in the uppermost position of vertical scan with the door 28 open, it will be noted as seen in FIGURE 5 that the shaft 101 has connected in co-rotatable assembly therewith a disk 240 recessed as at 241 to receive a coil spring 242 preloading a detent ball 243 in a radially outward direction, the detent ball 243 projecting beyond the circumferential periphery of the disk 240 for cooperation with a detent recess 244 formed in the peripheral surface of a detent disk 246 carried on a pin 247. As the shaft 101 is rotated in order to effect vertical scanning movement, the rotation of the shaft 101 to position the frame 110 at the uppermost limit of vertical scan will move the detent ball 243 into the detent recess 244, thereby holding the cover 28 open and positioning the film holder stationarily with the throat T open, thereby to facilitate loading and unloading. Tolerance adjustments can be effected by appropriate angular positioning of the disk 240 on shaft 101.

The disk 240 also carries a stop pin 250 which projects radially outwardly from the peripheral surface of the disk 240 and which is engageable with the pin 247 to limit the vertical scanning movements in both directions.

The various components of the reader or viewer 10 are manually powered by operation of the appropriate adjustment knobs 56, 61, 104 and 127, although an electric pushbutton switch is shown at S on FIGURE 1 in the control panel portion 30a, thereby to control energization of the light bulb 34 and the circuitry associated with the switch 230 and the motor of the fan 71.

Although minor modifications might be suggested by those versed in the art, it should be understood that we wish to embody within the scope of the patent warranted hereon all such modifications as reasonably and properly come within the scope of our contribution to the art.

We claim as our invention:

1. A film holder for a flat microfiche reader comprising:
    a pair of glass plates,
    a holder frame retaining said plates in clamped assembly,
    thereby to hold a flat microfiche therebetween,
        casing means including an opening through which said holder frame projects and including a traverse track supporting said frame for movement towards and away from said opening,
        a cover for said opening hinged on said casing means and engageable with said holder frame when said holder frame is moved into said opening,
    thereby to afford access to the microfiche,
        spring means for biasing said cover into closed position,
        camming means for automatically camming the glass plates apart when said holder frame is moved into said opening,
        and means for holding said holder frame in said opening and said door in open position,
    thereby facilitating insertion and removal of a microfiche from between the glass plates.

2. A flat microfiche holder for a reader comprising:
    a frame for holding a pair of glass plates and including continuous biasing means for clamping said glass plates together,
    an actuator having an elongated leg on each side of said frame and having an offset portion at one end thereof forming an action surface,
    at least one crank for each elongated leg having one leg of said crank pivotally connected to said elongated leg,
        the other leg of said crank having a camming toe for engaging a glass plate,
        and a cam pin on said crank arm pivotally connected to said frame,
    whereby displacement of said elongated legs of said actuator relative to said frame will pivotally displace said cranks, thereby pivotally separating said glass plates.

3. In a flat microfiche reader, a flat microfiche holder comprising:
    a frame for holding a pair of glass plates and including continuous biasing means for clamping said plates together,
    an actuator having an elongated leg on each side of said frame and each elongated leg having a transverse arm at one end thereof forming an action surface,
    at least one crank for each elongated leg,
        said crank having one leg thereof pivotally connected to said elongated leg and a second crank leg having a camming toe for engaging a glass plate,
        said crank having a cam pin pivotally connected to said frame,
    whereby displacement of said elongated legs of said actuator relative to said frame will pivotally displace said cranks to separate said glass plates,
    a casing having an opening through which said holder projects and including a traverse track supporting said frame for movement towards and away from said opening,
    thereby to afford access to said microfiche,
    and a cover for said opening hinged on said casing and engageable with said transverse arm on said actuators to automatically operate said actuator when said holder moves said cover to an open position.

4. A flat microfiche reader comprising:
    a casing,
    first and second rod means forming a horizontal traverse track and a vertical traverse track,
        one of said rod means being connected to said casing,
    separate racks having sliding coupling connections with said tracks and each presenting a row of rack teeth disposed to extend in horizontal and vertical directions,
        the other of said rod means being connected to said rack of said one of said rod means,
    inner and outer concentrically disposed actuator knobs on said casing corresponding to a horizontal scan actuator and a vertical scan actuator,
        each of said knobs having a driving connection with a corresponding pinion gear meshing with a corresponding horizontal and vertical traverse track, and a flat microfiche holder carried by said racks for adjustment in horizontal and vertical direction,
said casing having an opening into which said holder may be moved to afford access thereto,
and camming means adjacent said opening for automatically conditioning said holder as it moves into said opening for receiving or removing a flat microfiche.

5. A flat microfiche reader comprising:
a viewing screen,
a light source,
an optical system,
a frame for supporting a microfiche in said optical system intermediate said screen and said light source,
said frame being mounted for movement longitudinally and transversely of said microfiche to position different ones of multiple images on said microfiche in registration with said optical system,
a casing having an elongated opening formed therein into which said frame is movable at the limit of transverse displacement for giving access to said frame,
a door for said opening,
hinge means pivoting said door on said casing for pivotal opening and closing movement relative to said casing,
means biasing said door in the direction of said closing movement,
actuating means between said door and said frame engageable with one another for automatically conditioning said frame to remove or receive a microfiche from said frame upon movement of said frame into said opening,
and means holding said frame in position in said opening thereby holding said door in open position against the bias of said biasing means.

6. A flat microfiche reader comprising:
a casing,
an upright viewing screen in said casing,
an angularly offset hinged door extending downwardly and forwardly of said screen and being pivotally movable towards said screen to uncover an access opening for a microfiche holder,
a control panel on said casing spaced forwardly of said door and extending in an inclined plane generally parallel to the closed position of said door,
a pair of concentrically disposed scan control knobs on said control panel for controlling horizontal and vertical scan of a microfiche holding frame,
a light source subjacent said control panel,
a mirror in said casing spaced behind said viewing screen,
an optical system including a rotatable adjustable focus lens between said mirror and said light source,
a frame for supporting a microfiche in said optical system between said lens and said light source,
said frame being mounted for movement in the focal plane of said lens longitudinally and transversely of the microfiche,
rack and pinion drive means having driven connections with said scan control knobs to position different ones of multiple images on said microfiche in registration with said optical system,
and abutment means between said door and said frame engageable with one another to automatically open said door when said frame is moved into said access opening.

7. A flat microfiche reader as defined in claim 6 and further characterized by said optical system including image rotation means to rotate the image optically,
and a pair of adjustment knobs on opposite sides of said casing including shaft driven means to rotatably adjust lens focus with one of said knobs and to rotate the image selectively with the other of said knobs.

8. In a flat microfiche reader,
a casing having an access opening,
a frame mounted for scanning movement horizontally and vertically in an optical plane of an optical system having a light source, lens and viewing screen,
thereby to select any image of multiple images on the microfiche for viewing,
a hinged door for closing said access opening,
a rotatable knob for effecting vertical scan adjustment of said frame,
a shaft driven by said knob,
a gear and worm drive driven by said shaft upon rotation of said knob,
said worm drive rotatably driving a pinion and rack drive,
thereby to translate said frame in its vertical scan,
and a locking mechanism comprising first and second parts including a first disk part co-rotatable with said knob and carrying a spring-biased detent ball and a stop pin,
and a second disk having a detent recess for receiving and seating said detent ball and for engaging said stop pin,
abutment means between said door and said frame engageable to open said door when said frame is at the top of its vertical scan,
said detent ball engaging said recess to hold the cover open and position the frame in an accessible position in said access opening,
said stop pin limiting movement of said vertical scan in a downward direction.

References Cited

UNITED STATES PATENTS

| | | | |
|---|---|---|---|
| 1,894,005 | 1/1933 | Rose | 88—24 |
| 2,260,551 | 10/1941 | Boni et al. | 88—24 |
| 2,685,227 | 8/1954 | Brietzke | 88—24 |
| 2,701,979 | 2/1955 | Pratt et al. | 88—24 |
| 2,937,569 | 5/1960 | Wilton | 88—24 |
| 3,224,326 | 12/1965 | Brownscombe | 88—24 |

NORTON ANSHER, *Primary Examiner.*

R. M. SHEER, *Assistant Examiner.*

U.S. Cl. X.R.

353—76, 77